United States Patent
Linnenkohl

(10) Patent No.: US 12,385,524 B2
(45) Date of Patent: Aug. 12, 2025

(54) GUIDE DEVICE AND DOOR SYSTEM

(71) Applicant: GEBR. BODE GMBH & CO. KG, Kassel (DE)

(72) Inventor: Lars Linnenkohl, Staufenberg (DE)

(73) Assignee: BODE—DIE TÜR GMBH, Kassel (DE)

(*) Notice: Subject to any disclaimer, the term of this patent is extended or adjusted under 35 U.S.C. 154(b) by 193 days.

(21) Appl. No.: 18/022,889

(22) PCT Filed: Aug. 13, 2021

(86) PCT No.: PCT/EP2021/072596
§ 371 (c)(1),
(2) Date: Feb. 23, 2023

(87) PCT Pub. No.: WO2022/043096
PCT Pub. Date: Mar. 3, 2022

(65) Prior Publication Data
US 2023/0304534 A1  Sep. 28, 2023

(30) Foreign Application Priority Data
Aug. 25, 2020  (DE) .......................... 202020104914.3

(51) Int. Cl.
A47H 15/00 (2006.01)
B60J 5/06 (2006.01)
F16C 29/06 (2006.01)

(52) U.S. Cl.
CPC ........... *F16C 29/0607* (2013.01); *B60J 5/062* (2013.01); *F16C 29/0609* (2013.01);
(Continued)

(58) Field of Classification Search
CPC ............ E05D 15/0652; E05D 15/0643; E05D 15/0621; E05D 15/0686; E05D 15/0647;
(Continued)

(56) References Cited

U.S. PATENT DOCUMENTS 5,893,181 A * 4/1999 Moncaster .......... E05D 15/0643
4/557
2010/0254638 A1* 10/2010 Traiser .................. F16C 29/123
384/49
(Continued)

FOREIGN PATENT DOCUMENTS

AT 410819 B * 6/2003 ................ B60J 5/06
DE 8715922 U1 1/1988
(Continued)

OTHER PUBLICATIONS

Translated International Search Report for International Application No. PCT/EP2021/072596, International Filing Date Aug. 13, 2021, Date of Mailing Dec. 1, 2021, 2 pages.

*Primary Examiner* — Chuck Y Mah
(74) *Attorney, Agent, or Firm* — CANTOR COLBURN LLP

(57) ABSTRACT

A guide device having, a guide rail and a runner, which engages at least in part in the guide rail and is guided in a linearly movable manner in the guide rail via a recirculating ball bearing. The balls associated with the recirculating ball bearing are arranged in at least one ball row and guided in at least one ball raceway. The balls associated with a ball row are each guided in a ball raceway composed of two partial ball raceways. The first partial ball raceway is formed in the runner and extends along a runner longitudinal axis. The second ball raceway is formed by a guide groove, formed on the runner and extends along the runner longitudinal axis, and a guide rail guide groove, opposite the runner guide groove and formed on the guide rail.

12 Claims, 2 Drawing Sheets

(52) U.S. Cl.
CPC ........ *F16C 29/0611* (2013.01); *F16C 29/063* (2013.01); *F16C 2326/01* (2013.01)

(58) Field of Classification Search
CPC ... B60J 5/062; B60J 5/065; B60J 5/08; B61D 19/005; B61D 19/007; B61D 19/02; E05Y 2900/506; E05Y 2900/51; E05Y 2900/516; E05Y 2900/518; E05Y 2900/50; F16C 29/0609; F16C 29/0611; F16C 29/063; F16C 2326/01
See application file for complete search history.

(56) References Cited

U.S. PATENT DOCUMENTS

| | | | | |
|---|---|---|---|---|
| 2011/0209306 | A1* | 9/2011 | Pritz | E05D 15/0652 16/91 |
| 2015/0184440 | A1* | 7/2015 | Choi | E05D 15/0621 16/102 |

FOREIGN PATENT DOCUMENTS

| | | | | |
|---|---|---|---|---|
| DE | 3636138 | A1 | 4/1988 | |
| DE | 4005582 | A1 | 9/1991 | |
| DE | 102006016615 | A1 * | 10/2007 | ............ F16C 29/063 |
| EP | 0443098 | A1 | 8/1991 | |
| EP | 1319853 | A2 | 6/2003 | |
| EP | 1914372 | A2 | 4/2008 | |
| EP | 3037316 | A1 * | 6/2016 | |
| EP | 3805501 | A1 * | 4/2021 | ............ E05D 15/066 |
| KR | 20070013769 | A | 1/2007 | |
| WO | WO-9747900 | A1 * | 12/1997 | ................ B60J 5/06 |
| WO | WO-2007128771 | A1 * | 11/2007 | ............ E05D 15/063 |

* cited by examiner

GUIDE DEVICE AND DOOR SYSTEM

CROSS-REFERENCE TO RELATED APPLICATIONS

The present application is a 35 U.S.C. § 371 National Stage patent application of International patent application PCT/EP2021/072596, filed on 13 Aug. 2021, which claims priority to German patent application 202020104914.3, filed on 25 Aug. 2020, the disclosures of which are incorporated herein by reference in their entirety.

TECHNICAL FIELD

The present disclosure relates to a guiding device, comprising a guide rail and a slider, which at least partially reaches into the guide rail and is guided in a linearly movable manner in the guide rail via a recirculating ball bearing, wherein the balls associated with the recirculating ball bearing are lined up in at least one ball row and guided in at least one ball track, wherein the balls associated with a respective ball row are respectively guided in a ball track composed of a first and a second partial ball track, wherein the first partial ball track is formed in the slider and extends along a longitudinal slider axis, and wherein the second partial ball track is formed by a slider guiding groove, which is formed on the slider and extends along the longitudinal slider axis, and a guide rail guiding groove, which is situated opposite the slider guide groove and formed on the guide rail, and wherein redirecting means for redirecting the balls from the first into the second partial ball track and vice versa are respectively arranged in the region of, in relation to the longitudinal slider axis, a first and a second slider end.

The present disclosure further relates to a door system, in particular a sliding or pivot sliding door system, for a public transport vehicle, comprising a door leaf, which can be moved, using a drive unit, from a position closing a door portal of the vehicle into an open position enabling the entry of passengers through the door portal, wherein the door leaf is carried in a carrier guide, the carrier guide comprising a guiding device according to the disclosure.

A public transport "vehicle" can be understood to denote wheeled or railbound vehicles. A wheeled vehicle may be, for example, a bus or other transport vehicle intended for passenger transport. A railbound vehicle may be a train (e.g. a high-speed train or a commuter train), a streetcar, a tram, an urban-suburban commuter railway train (S-Bahn), an underground train etc.

The disclosure may relate to passenger doors with one or two leaves, wherein the passenger doors can be configured as a sliding door or a pivot sliding door. For the purpose of simplification, the following explanations relate to a passenger door equipped with one door leaf. Accordingly, the terms and descriptive passages used in the present case, which relate to "one" door leaf, do not exclude the possibility of using the disclosure also in passenger doors with two or more leaves. A "door panel" may also be understood to be synonymous with a "door leaf".

BACKGROUND

Guiding devices with recirculating ball guides are generally known from the prior art, particularly for providing highly precise guides capable of bearing very high loads. A typical field of application of recirculating ball guides is machine tool technology. Nevertheless, recirculating ball guides can also be used in other fields of technology in which linear guides are of importance. Such guides are used in, for example, door systems of public transport vehicles, in particular for transporting passengers, e.g. in sliding or pivot sliding door systems.

A guiding device with the features described in the introduction, which is used in a passenger door fora public transport vehicle, is known from EP 1 914 372 A2, for example. In particular, the guiding device there comprises a guide rail and a slider, which at least partially reaches into the guide rail and is guided in a linearly movable manner in the guide rail via a recirculating ball bearing, wherein the balls associated with the recirculating ball bearing are lined up in two ball rows and guided in ball tracks, wherein the balls associated with a respective ball row are respectively guided in a ball track composed of a first and a second partial ball track, wherein the first partial ball tracks are formed in the slider and extend, in a parallel arrangement, along a longitudinal slider axis, and wherein the second partial ball tracks are each formed by a slider guiding groove, which is formed on the slider and extends along the longitudinal slider axis, and a guide rail guiding groove, which is situated opposite the respective slider guide groove and formed on the guide rail, and wherein redirecting means for redirecting the balls from one of the first into one of the second partial ball tracks and vice versa are respectively arranged in the region of, in relation to the longitudinal slider axis, a first and a second slider end.

The design there is disadvantageous in that the balls have to be filled into the ball tracks formed on the slider prior to mounting the ball redirecting means. A simple subsequent replacement of the balls in the mounted state of the guiding device is not ensured but at least requires the ball redirecting means to be dismantled, which thus entails an increased effort. Moreover, the guiding device known from EP 1 914 372 A2 has a carrier configured for carrying a door leaf. The carrier is mounted on the slider and extends across almost the entire length of the slider. A drawback of a carrier configured in this manner—particularly if used in a passenger door of a public transport vehicle—is the relatively large own weight resulting from the massive construction and the relatively large construction space requirement.

SUMMARY

Accordingly, the present disclosure is based on providing a guiding device for a door system for a public transport vehicle with which a flexible loading with or replacement of balls associated with the recirculating ball bearing is ensured even in the mounted state, and the weight and need for construction space is reduced.

In order to accomplish this, a guiding device having the features of an independent claim and a door system having the features of another claim are proposed.

It must be noted that the features cited individually in the claims can be combined with each other in any technologically meaningful manner and represent other embodiments of the disclosure. The description, in particular in connection with the figures, additionally characterizes and specifies the disclosure. Also, the features described in connection with a guiding device according to the disclosure may be advantageous embodiments of a door system according to the disclosure and vice versa.

It may also be noted that a conjunction "and/or" used hereinafter, which is situated between two features and links them to each other, should always be interpreted such that, in a first embodiment of the subject matter according to the disclosure, only the first feature may be provided, in a second embodiment of the subject matter according to the disclosure, only the second feature may be provided, and in a third embodiment of the subject matter according to the disclosure, both the first and the second feature may be provided.

As was already mentioned, the present disclosure first relates to a guiding device, comprising a guide rail and a slider, which at least partially reaches into the guide rail and is guided in a linearly movable manner in the guide rail via a recirculating ball bearing, wherein the balls associated with the recirculating ball bearing are lined up in at least one ball row and guided in at least one ball track, wherein the balls associated with a respective ball row are respectively guided in a ball track composed of a first and a second partial ball track, wherein the first partial ball track is formed in the slider and extends along a longitudinal slider axis, and wherein the second partial ball track is formed by a slider guiding groove, which is formed on the slider and extends along the longitudinal slider axis, and a guide rail guiding groove, which is situated opposite the slider guide groove and formed on the guide rail, and wherein redirecting means for redirecting the balls from the first into the second partial ball track and vice versa are respectively arranged in the region of, in relation to the longitudinal slider axis, a first and a second slider end.

The guiding device is characterized in that the first partial ball track is formed by a guide channel, which extends along the longitudinal slider axis and is formed in the slider, and a cover plate delimiting the guide channel towards the outside, wherein the cover plate is detachably connected to the slider. In this case, the cover plate is not absolutely required to be configured like a flat plate but may have a profile or geometry adapted to the slider geometry. The cover plate may be made from the same material as the slider, e.g. from metal. Likewise, being made from a plastic or a composite material is also an option for the slider and the cover plate. A peripherally extending seal may be provided between the cover plate and the slider, which may be formed from sealing lips that are disposed on the cover plate and/or the slider and be made from rubber, for example.

The cover plate being detachably connected with the slider enables the recirculating ball bearing to be filled with balls even in an assembled state of the guiding device (e.g. in a carrier guide of a door system which is also proposed by the disclosure). Likewise, defective or worn balls can be easily replaced in such a mounted state without the need for dismantling the guiding device. Accordingly, the maintenance of the guiding device is made simpler and more flexible with the present disclosure.

In the present disclosure—as is known from the prior art—the balls are preferably lined up in two ball rows, wherein the balls of a respective ball row are guided in a ball track formed of a first partial ball track and a second partial ball track. In this case, the first and second partial ball tracks are arranged in a parallel manner.

The guide rail may be, in particular, a metal profile, which may be a drawn U-shaped or C-shaped profile, wherein the profile has a profile base and two profile legs adjacent to the profile base. The above-mentioned guide rail guiding grooves, which together with the slider guiding groove form the second partial ball tracks, are in this case respectively formed in the profile legs of the profile, i.e.—in relation to the profile—situated on the inside and facing towards each other. The guide rail constitutes a component arranged in a fixed, i.e. non-movable or stationary, manner, wherein the slider provides a bearing part that can be moved in a plane-parallel manner relative to the guide rail. The above-mentioned ball rows in this case absorb a bearing load acting between the fixed bearing part and the movable bearing part. For instance, a bearing load may be due to a load member attached to the slider, e.g. a door leaf. Guide rails configured in this way can be fabricated and mounted in a relatively simple manner. Even more complex guide assemblies can be constructed with such guide rails.

As was already mentioned, a slider is guided in the guide rail in a linearly movable manner. Of course, several sliders may also be guided in the above-mentioned guide rail. The slider has a profiled shape and provides two slider guiding grooves, each of which is situated opposite a guide rail guiding groove formed in the profile legs. Thus, a shielded and stable support of the balls is ensured. In the mounted state, the slider is linearly displaceable relative to the guide rail, which is disposed in a positionally stationary manner; a relative movement in a direction transverse to the guide rail is prevented by the recirculating ball guide, which is why the slider is secured against falling out from the guide rail.

As was mentioned, the first partial ball tracks are each formed by a guide channel, which extends along the longitudinal slider axis and is formed in the slider, and a cover plate delimiting the guide channel towards the outside, wherein the cover plate is detachably connected to the slider. In this case, the guide channels are arranged parallel to one another and preferably configured identically. In cross section, the respective guide channels are configured like half shells, i.e. they have a half shell opening extending along the guide channel, wherein the half shell openings of both guide channels are delimited towards the outside by the cover plate. The cover plate can be attached to the slider by suitable connecting means or fastening means. The attachment or fastening is in this case reversible (i.e. detachable), so that a simple replacement of the balls disposed in the guide channels is possible.

Other advantageous embodiments of a guiding device according to the disclosure are apparent from the features specified in dependent claims and those described hereinafter. The features specified in the dependent claims are also described in the following.

According to a first advantageous embodiment, it may be provided in a guiding device proposed by the disclosure that the balls can be replaced when the cover plate is removed. In the guiding devices known from the prior art, the replacement of the balls forming the bearing generally requires the dismantling of several components of the guiding device, which entails an increased time requirement and installation effort. Thus, a replacement of balls in the sliders known from EP 1 914 372 A2 can only take place, for instance, through openings provided at the slider ends or the end faces of the slider. To this end, it is necessary to remove the redirecting means provided in the region of the slider ends and reinstall them subsequent to the replacement of the balls being complete. In the present disclosure, the balls can be replaced by simply removing the cover plate. Initially filling the recirculating ball bearing with balls is also possible in this way—even if the slider is already inserted into the guide rail and the redirecting means are installed.

According to another advantageous embodiment, it may be provided in a guiding device proposed by the disclosure that the balls guided in the first partial ball tracks abut, with their ball surface, against an inner surface of the guide channel and/or against an inner surface of the cover plate facing towards the guide channel. As the conjunction "and/or" makes apparent, the balls—provided they are located in the area of the first partial ball tracks—may abut both against an inner surface of the guiding channel and against the inner surface of the cover plate and be guided by the above-mentioned inner surfaces. Depending on the geometry, size and position in space (or orientation in space) of the slider and the cover plate, however, the balls may also be in contact (at least temporarily) only with the inner surface of the guide channel or the inner surface of the cover plate. The surface contact of the balls may change, in particular, due to the guiding device being inclined in space. Likewise, the first partial ball tracks delimited by the guide channels and the cover plate may also be configured such, with regard to their size and shape, that the first partial ball tracks have a diameter adapted to the diameter of the balls and the balls abut against the above-mentioned inner surfaces during their movement along the first partial ball tracks.

According to another advantageous embodiment, it may be provided in a guiding device proposed by the disclosure that the ball track guiding the balls of one of the ball rows is formed of a pair of one of the first and one of the second partial ball tracks, wherein the first and second partial ball tracks associated with the pair are situated diagonally opposite each other. In the case of such a crosswise arrangement in space of the partial ball tracks providing the respective ball tracks, the ball redirection of the balls from a first into a second partial ball track and vice versa is realized by the above-mentioned redirecting means, which—as was already mentioned—are arranged in the region of, in relation to the longitudinal slider axis, the first and second slider ends. Likewise, however, it is also possible that the partial ball tracks providing the ball tracks of a respective ball row are redirected perpendicularly, i.e. a respective first partial ball track is arranged above a respective second ball track. A perpendicular redirection results in a shorter redirection path for the balls. In contrast, a crosswise guidance or crosswise redirection of the balls permits the use of balls with larger diameters while maintaining the same structural height of the slider, i.e. the structural height of the slider in the redirecting or returning region (i.e. at the slider ends) does not have to be increased significantly. Such a guidance of the ball rows permits a compact structural shape of the slider and of the redirecting means, and thus also a compact structural shape of the guide device.

According to another advantageous embodiment, a carrier configured for carrying a load member, which is detachably connected to the slider, may be provided in a guiding device proposed by the disclosure. A load member may be directly attached to or arranged on such a carrier. A load member may also be indirectly attached to the carrier, i.e. by interposing suitable connecting, carrying or guiding means. An "attachment" does not preclude the carrier from also having guiding or bearing properties in addition to "carrying" a load. The fact that the carrier is detachably connected to the slider simplifies the installation of the guiding device prior to commissioning. Also, the carrier is thus more easily replaceable, e.g. in the case of damage or maintenance.

According to another advantageous embodiment, it may be provided in a guiding device proposed by the disclosure that the cover plate and the carrier are detachably connected to the slider via fastening means, particularly screwing means, wherein the cover plate is disposed between the slider and the carrier. In order to remove the cover plate (i.e. in order to replace the balls) in such an embodiment, the carrier has to be removed from the slider by loosening the fastening means. The attachment of the carrier or of the cover plate is preferably realized by fastening means acting in a manner distributed over the length of the carrier or the cover plate, i.e. the cover plate and the carrier have several fastening points in order to distribute the fastening forces in the best possible manner. A fastening web, into which a plurality of threaded openings is inserted over the length of the fastening web, may be formed on the slider between the guide channels. These threaded openings may be used for attaching the cover plate and the carrier to the slider using suitable fastening means (e.g. screwing means). The screwing means may preferably be threaded bolts. The above-mentioned fastening web of the slider is preferably an integral component of the same.

According to another advantageous embodiment, it may be provided in a guiding device proposed by the disclosure that the carrier is formed from
  a. a mounting portion configured to be detachably connected to the slider and/or the cover plate, wherein the mounting portion extends along the longitudinal slider axis over a partial length of the slider;
  b. a supporting flange, which is laterally adjacent to the mounting portion and configured to laterally rest, with a supporting surface, against the slider and be supported by the latter;
  c. and a carrier portion configured for carrying and/or guiding the load member.

It may also be provided that threaded openings are formed in the mounting portion, which can be brought congruently into alignment with threaded openings formed in the cover plate and the slider, so that the respective threaded openings are situated one above the other. Moreover, in an assembled state, screwing means, in particular threaded bolts, may reach into the threaded openings situated one above the other. Since the cover plate—as was already mentioned—is arranged between the carrier and the slider, the mounting portion of the carrier is firmly connected both with the cover plate and the slider via the screwing means. In the connected state, the screwing means, e.g. threaded bolts, penetrate the threaded openings provided on the carrier, the cover plate and the slider. Since the mounting portion, and thus also the carrier as a whole, extends along the longitudinal slider axis only over a partial length (e.g. half the length) of the slider, the carrier according to this disclosure can be formed to be in a more construction space-saving, i.e. compact, manner compared to the prior art. In addition to the construction space being thus reduced, the weight of the guiding device is also reduced. The threaded openings may preferably be uniformly arranged or distributed, in particular at regular intervals, along the mounting portion. The width of the mounting portion substantially corresponds to the width of the slider.

The supporting flange is integrally adjacent to the mounting portion and together with it forms a T-shape, wherein the mounting portion provides the "base", and the supporting flange the "roof", of the T-shape. In a mounted state, a portion of the supporting flange forming a part of the T-shape laterally rests against the slider and is supported thereby. The carrier portion is arranged and positioned such that the force vectors of the load member acting on the carrier portion can be at least partially compensated by the supporting flange resting against the slider, or that the associated forces can be transmitted. The supporting flange increases the ruggedness and carrying capacity of the guiding device. Spatially, the carrier portion may be disposed diagonally opposite the supporting surface of the supporting flange. Thus, due to its contact surface for the supporting surface of the supporting flange, the slider provides a counter bearing for the carrier portion. The carrier portion may have carrying means for the attachment or guidance of a load member. The carrying means may be configured in the shape of a carrier head, for example, which in turn may have a cylindrical through bore (for attaching or guiding the load member or a component connected therewith).

According to another advantageous embodiment, it may be provided in a guiding device proposed by the disclosure that the load member is a door leaf of a passenger door, in particular of a pivot sliding door or sliding door, of a vehicle. In this case, the carrier portion may have a device for arranging a rotating joint with an axis of rotation parallel to the guide rail, wherein a door leaf bracket can be attached to the rotating joint. The above-described guiding device is thus particularly suitable for holding and guiding a door leaf associated with a door system, e.g. a pivot sliding or sliding door system. Likewise, the guiding device is suitable for holding and guiding one or more (e.g., two) door leaves; the guiding device can thus be used in door systems with one or two door leaves.

The object on which the disclosure is based is also accomplished with a door system, in particular a sliding or pivot sliding door system, for a public transport vehicle. The door system comprises a door leaf (optionally also several, e.g. two, door leaves), which can be moved, using a drive unit, from a position closing a door portal of the vehicle into an open position enabling the entry of passengers through the door portal, wherein the door leaf is carried in a carrier guide. The carrier guide comprises a guiding device configured in accordance with the disclosure. In this case, the carrier guide or guiding device is preferably arranged in the upper area of the door portal. In this case, a guiding device according to the disclosure is not limited to a certain type of door system. The guiding device may also be retrofitted into door systems already implemented in a vehicle.

BRIEF DESCRIPTION OF THE DRAWINGS

Other features and advantages of the disclosure become apparent from the following description of an exemplary embodiment of the disclosure, which is to be understood not to be limiting and which will be explained below with reference to the drawings. These drawings schematically show.

DETAILED DESCRIPTION OF THE DRAWINGS

Figure 1:
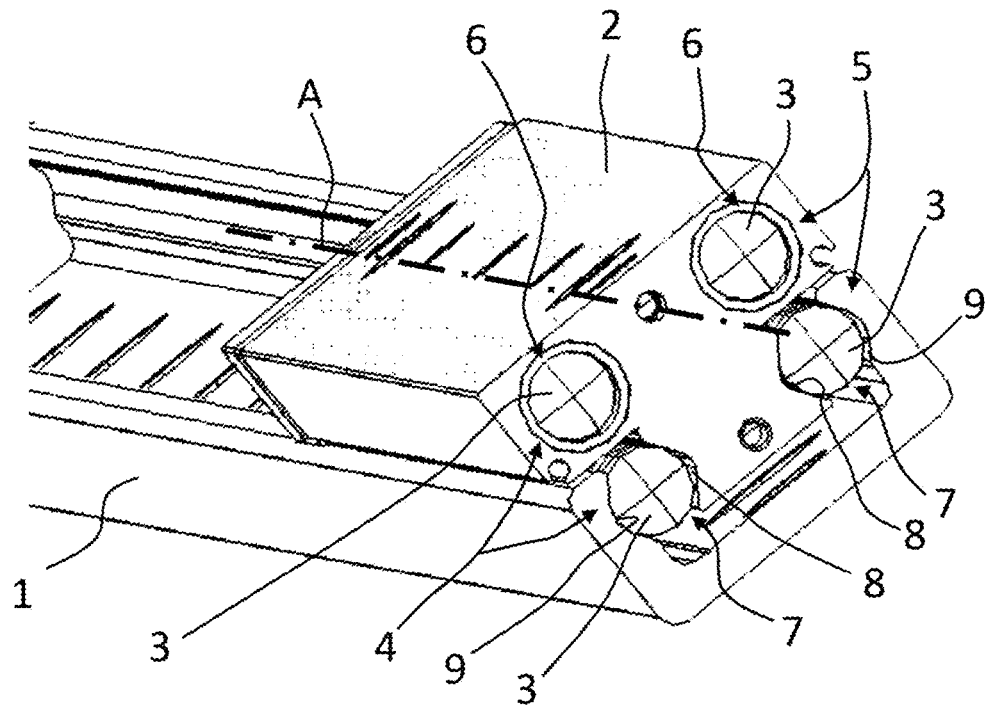
FIG. 1 a perspective partial view of a slider movably guided in a guide rail, as known from the prior art.

FIG. 1 presents a perspective partial view of a guiding device with a slider 2 guided in a linearly movable manner in a guide rail 1, which is known from the prior art, particularly EP 1 914 372 A2. The slider 2 at least partially reaches into the guide rail 1. The guide rail 1 is formed like a C-profile.

The guiding device may be used, for example, in a door system, which is not depicted, of a vehicle (e.g. a public transport vehicle). The guiding device is primarily suitable for use in a sliding or pivot sliding door system. The door system comprises a door leaf (optionally also several, e.g. two, door leaves), which can be moved, using a drive unit, from a position closing a door portal of the vehicle into an open position enabling the entry of passengers through the door portal, wherein the door leaf is carried in a carrier guide. The carrier guide comprises the above-mentioned guiding device. In this case, the carrier guide or guiding device is preferably arranged in the upper area of the door portal. The guiding device may also be retrofitted into door systems already implemented in a vehicle.

The linearly movable guidance of the slider 2 in the guide rail 1 is realized by a recirculating ball bearing, wherein the balls 3 associated with the recirculating ball bearing are lined up in two ball rows 4, 5 and guided in ball tracks. The balls 3 associated with a respective ball row 4, 5 are each guided in a ball track composed of a first and a second partial ball track 6, 7.

The first partial ball tracks 6 are formed in the slider 2 and extend, in a parallel arrangement, along a longitudinal slider axis A. The second partial ball tracks 7 are each formed by a slider guiding groove 8, which is formed on the slider 2 and extends along the longitudinal slider axis A, and a guide rail guiding groove 9, which is situated opposite the respective slider guide groove 8 and formed on the guide rail 1.

Figures 2A, 2B:
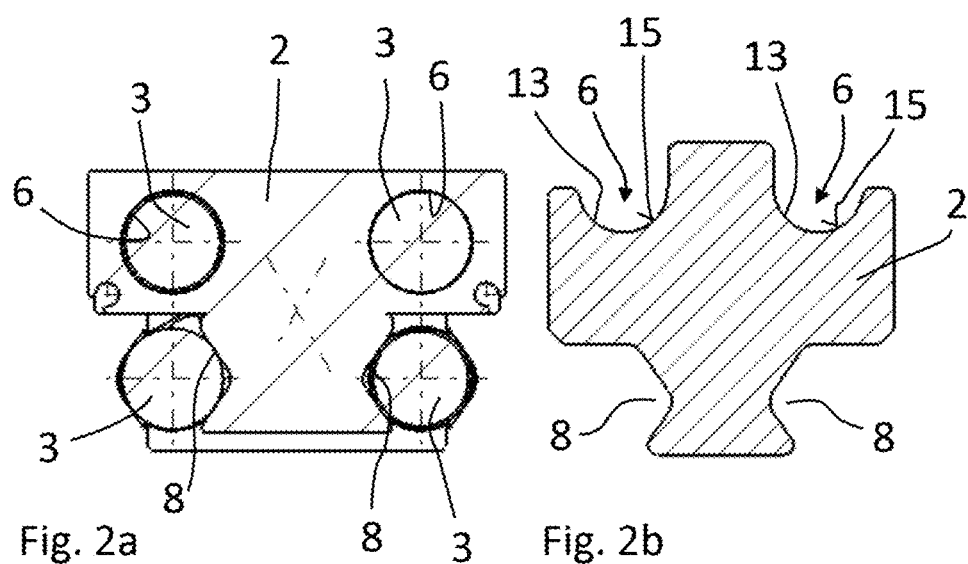
FIG. 2a a cross-sectional view of a slider filled with balls, as known from the prior art.
FIG. 2b a cross-sectional view of a slider used in a guiding device according to the disclosure.

FIG. 2a illustrates a cross-sectional view of the slider 2 filled with balls 3, which was already shown in FIG. 1 in connection with the guide rail 1, as it is known from the prior art. A respective ball track guiding the balls 3 of one of the ball rows 4, 5 is formed of a pair of one of the first partial ball tracks 6 and one of the second partial ball tracks 7, wherein the first and second partial ball tracks 6, 7 associated with the pair are situated diagonally opposite each other. In cross section, the slider 2 has a T-shape, wherein the first partial ball tracks 6 are in this case configured in the shape of closed guide channels formed in the slider 2. Accordingly, a replacement of balls can only take place at the end faces of the slider 2.

Figure 3:
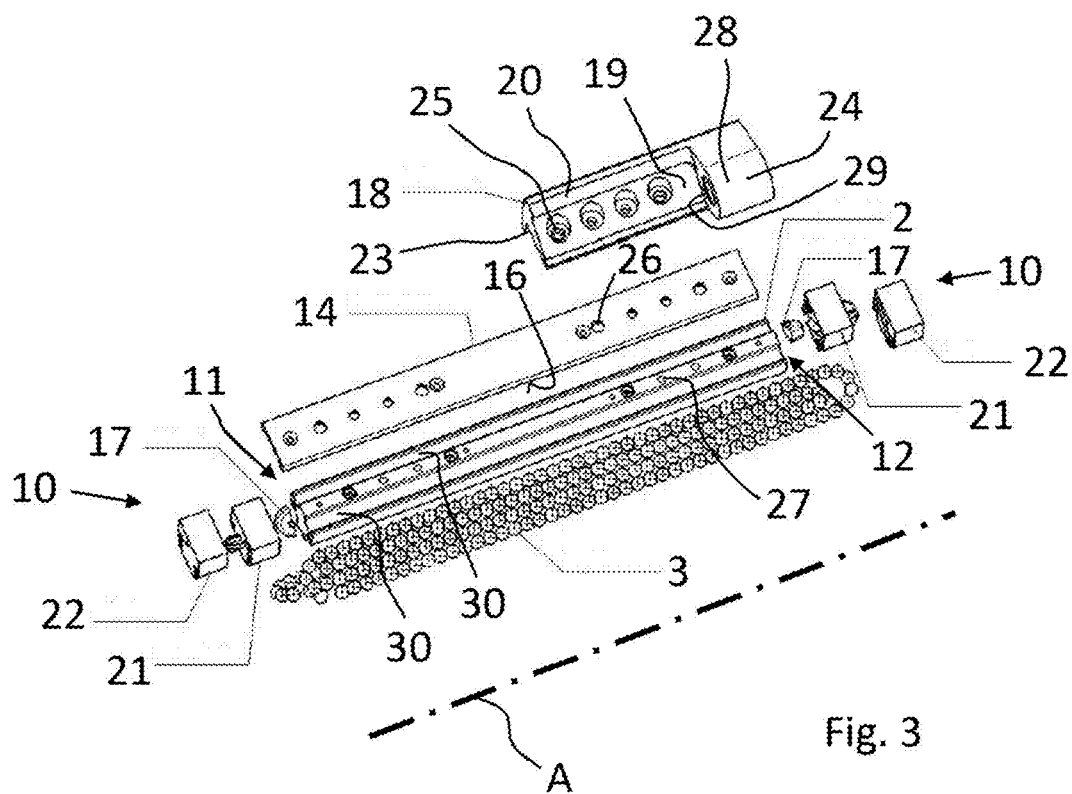
FIG. 3 an exploded view of essential components associated with the guiding device according to the disclosure.

In contrast, in a slider 2 according to the disclosure (see FIG. 2b), the respective guide channels 30 (FIG. 3) of the first partial ball tracks 6 are configured like half shells 13, i.e. they have a half shell opening extending along the guide channel 30. According to the disclosure, the half shell openings of both parallel guide channels 30 are delimited towards the outside by the cover plate 14 (FIG. 3, 4). The cover plate 14 is attached to the slider 2 by suitable connecting means or fastening means. The connection or fastening is in this case reversible (i.e. detachable), so that a simple replacement of the balls 3 disposed in the first partial ball tracks is possible (even in the installed state of the guiding device). In this case, the balls 3 guided in the first partial ball tracks 6 abut, with their ball surface, against an inner surface 15 of the guide channel 30 and/or against an inner surface 16 of the cover plate 14 facing towards the guide channel 30. The second partial ball tracks 7—as in the guiding device known from the prior art (see FIG. 1)—are each formed by a slider guiding groove 8, which is formed on the slider 2 and extends along the longitudinal slider axis A, and a guide rail guiding groove 9, which is situated opposite the slider guide groove 8 and formed on the guide rail 1.

In the case of such a crosswise arrangement in space of the partial ball tracks 6, 7 providing the respective ball tracks, the ball redirection of the balls 3 from one of the first partial ball tracks 6 into one of the second partial ball tracks 7 and vice versa is realized by redirecting means 10, which are arranged in the region of, in relation to the longitudinal slider axis A, a first and a second slider end 11, 12 (see FIG. 3). The redirecting means 10 may have a single-part or multi-part configuration. As is shown in FIG. 3, the redirecting means 10 arranged at a respective slider end 11, 12 are composed of a first partial redirecting means 21 and a second partial redirecting means 22, each realizing the redirection of the balls 3 of one of the ball tracks. In addition to the first and second partial redirecting means 21, 22, the respective redirecting means 10 may additionally have insert members 17 whose function will not be described in more detail at this point.

The components of the guiding device according to the disclosure, which cooperate with the slider 2 according to the disclosure, are shown in the exploded view according to FIG. 3. Thus, the guiding device, in addition to the previously described components, comprises a carrier 18, which is configured for carrying a load member (not shown) and detachably connected with the slider 2. The carrier 18 is formed from a mounting portion 19 configured to be detachably connected to the slider 2 and/or the cover plate 14, wherein the mounting portion 19 extends along the longitudinal slider axis A over a partial length of the slider 2. The carrier 18 further comprises a supporting flange 20, which is laterally adjacent to the mounting portion 19 and configured to laterally rest, with a supporting surface 23, against the slider 2 and be supported by the latter. Moreover, the carrier 18 has a carrier portion 24 configured for carrying and/or guiding the load member.

The supporting flange 20 is integrally adjacent to the mounting portion 19 and together with it forms a T-shape, wherein the mounting portion 19 provides the "base", and the supporting flange 20 the "roof", of the T-shape. In a mounted state, a portion (the supporting surface 23) of the supporting flange 20 forming a part of the T-shape laterally rests against the slider 2 and is supported thereby.

The carrier portion 24 is arranged and positioned such that the force vectors of the load member (not shown) acting on the carrier portion 24 can be at least partially compensated by the supporting flange 20 resting against the slider 2, or that the associated forces can be transmitted (in the direction of the guide rail 1). The supporting flange 20 increases the ruggedness and carrying capacity of the guiding device. Spatially, the carrier portion 24 is disposed diagonally opposite the supporting surface 23 of the supporting flange 20. Thus, due to its contact surface for the supporting surface 23 of the supporting flange 20, the slider 2 provides a counter bearing for the carrier portion 24. The carrier portion 24 includes carrying means for the attachment or guidance of the load member. In the exemplary embodiment shown (which is not to be understood to be limiting), the carrying means are configured in the shape of a carrier head 28, wherein the carrier head 28 has a cylindrical through bore 29 (for attaching or guiding the load member or a component connected therewith).

In a mounted state, the cover plate 14 and the carrier 18 are detachably connected to the slider 2 via fastening means, particularly screwing means, wherein the cover plate 14 is disposed between the slider 2 and the carrier 18. In order to connect the above-mentioned components, threaded openings 25 are formed in the mounting portion 19, which can be brought congruently into alignment with threaded openings 26, 27 formed in the cover plate 14 and the slider 2, so that the respective threaded openings are situated one above the other and can be connected using threaded bolts (not shown).

Figure 4:
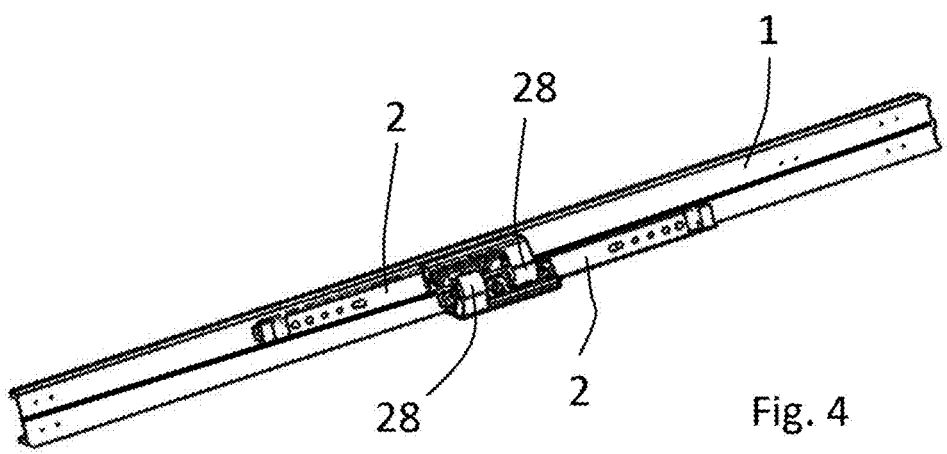
FIG. 4 a perspective view of a guiding device according to the disclosure.

As is schematically illustrated in FIG. 4, several sliders 2 (including the associated components, such as the carrier 18 for load members) may also arranged on a guide rail 1, wherein such an assembly may be used in sliding doors or pivot sliding doors with two door leaves, for example. One door leaf may be respectively attached to and/or guided on the respective carrier 18 or carrier heads 28.

The invention claimed is:

1. A guiding device comprising a guide rail and a slider, which at least partially reaches into the guide rail and is guided in a linearly movable manner in the guide rail via a recirculating ball bearing, wherein the balls associated with the recirculating ball bearing are lined up in at least one ball row and guided in at least one ball track, wherein the balls associated with a respective ball row are respectively guided in a ball track composed of a first and a second partial ball track,
   wherein the first partial ball track is formed in the slider and extends along a longitudinal slider axis, and wherein the second partial ball track is formed by a slider guiding groove, which is formed on the slider and extends along the longitudinal slider axis, and a guide rail guiding groove, which is situated opposite the slider guide groove and formed on the guide rail, and wherein redirecting means for redirecting the balls from the first into the second partial ball track and vice versa are respectively arranged in the region of, in relation to the longitudinal slider axis, a first and a second slider end, wherein the first partial ball track is formed by a guide channel, which extends along the longitudinal slider axis and is formed in the slider,
   and a cover plate delimiting the guide channel towards the outside, wherein the cover plate is detachably connected to the slider, wherein a carrier is detachably connected with the slider and configured for carrying a load member, the carrier is formed from
   a. a mounting portion configured to be detachably connected to the slider and/or the cover plate, wherein the mounting portion extends along the longitudinal slider axis over a partial length of the slider;
   b. a supporting flange, which is laterally adjacent to the mounting portion and configured to laterally rest, with a supporting surface, against the slider and be supported by the latter;
   c. and a carrier portion configured for carrying and/or guiding the load member.

2. The guiding device according to claim 1, wherein the balls are lined up in two ball rows, wherein the balls of a respective ball row are guided in a ball track formed of a first partial ball track and a second partial ball track.

3. The guiding device according to claim 2, wherein the first and second partial ball tracks are arranged in a parallel manner.

4. The guiding device according to claim 2, wherein the balls guided in the first partial ball tracks abut, with their ball surface, against an inner surface of the guide channel and/or against an inner surface of the cover plate facing towards the guide channel.

5. The guiding device according to claim 2, wherein the ball track guiding the balls of one of the ball rows is formed of a pair of one of the first and one of the second partial ball tracks, wherein the first and second partial ball tracks associated with the pair are situated diagonally opposite each other.

6. The guiding device according to claim 1, wherein the balls are configured to be replaced when the cover plate is removed.

7. The guiding device according to claim 1, wherein the cover plate and the carrier are detachably connected to the slider via fastening means, wherein the cover plate is disposed between the slider and the carrier.

8. The guiding device according to claim 1, wherein threaded openings are formed in the mounting portion, configured to be brought congruently into alignment with threaded openings formed in the cover plate and the slider, so that the respective threaded openings are situated one above the other.

9. The guiding device according to claim 8, wherein in an assembled state, screwing means, reach into the threaded openings situated one above the other.

10. The guiding device according to claim 1, wherein the load member is a door leaf of a passenger door of a vehicle.

11. The guiding device according to claim 1, wherein the carrier portion has a device for arranging a rotating joint with an axis of rotation parallel to the guide rail, wherein a door leaf bracket is configured to be attached to the rotating joint.

12. A door system for a public transport vehicle, the door system comprising a door leaf configured to be moved, using a drive unit, from a position closing a door portal of the vehicle into an open position enabling the entry of passengers through the door portal, wherein the door leaf is carried in a carrier guide, the carrier guide comprising a guiding device configured in accordance with claim 1.

* * * * *